R. WALLER.
AUTOMATIC TRAIN STOP.
APPLICATION FILED SEPT. 11, 1917. RENEWED DEC. 19, 1919.
1,343,857.
Patented June 15, 1920.
3 SHEETS—SHEET 2.
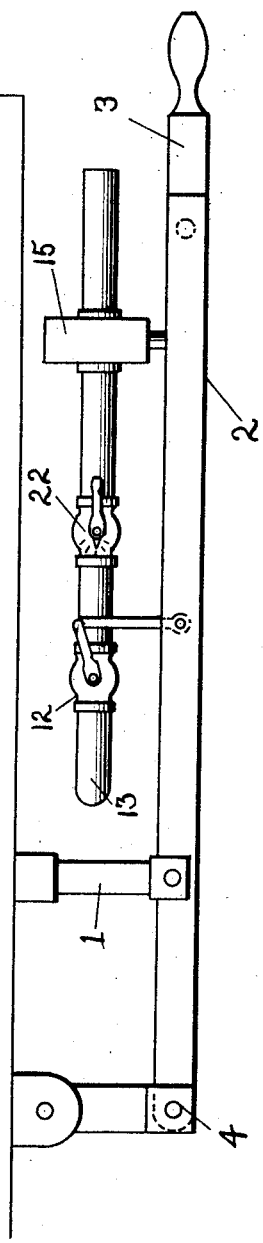
Inventor
Robert Waller.
By Victor J. Evans
Attorney R. WALLER.
AUTOMATIC TRAIN STOP.
APPLICATION FILED SEPT. 11, 1917. RENEWED DEC. 19, 1919.
1,343,857.
Patented June 15, 1920.
3 SHEETS—SHEET 3.
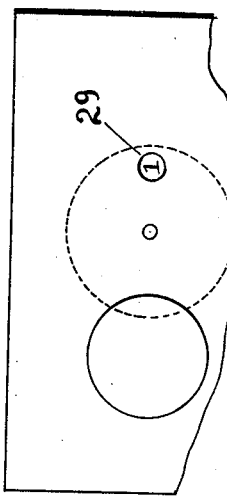
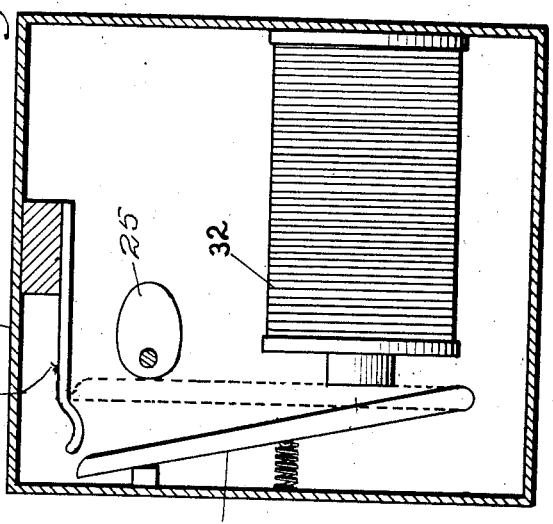
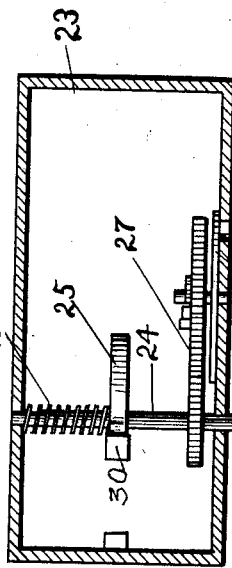
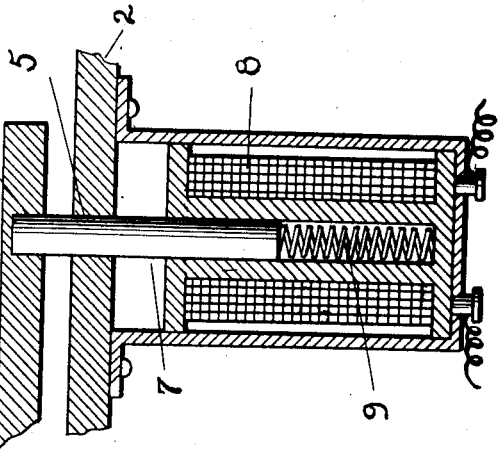
Inventor
Robert Waller.
By Victor J. Evans.
Attorney
Thos. B. Roscow

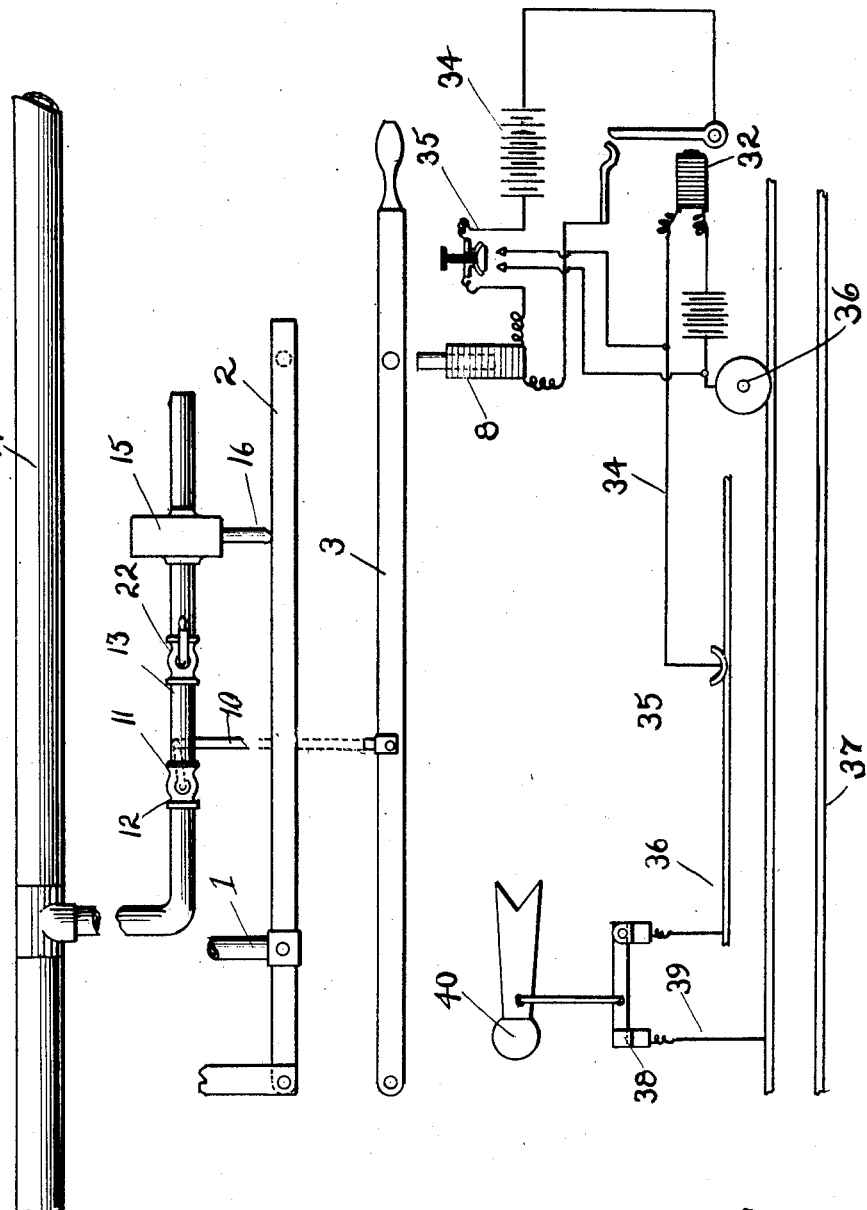

UNITED STATES PATENT OFFICE.

ROBERT WALLER, OF PITTSBURGH, PENNSYLVANIA.

AUTOMATIC TRAIN-STOP.

1,343,857. Specification of Letters Patent. Patented June 15, 1920.

Application filed September 11, 1917, Serial No. 190,841. Renewed December 19, 1919. Serial No. 346,166.

*To all whom it may concern:*

Be it known that I, ROBERT WALLER, a citizen of the United States, residing at Pittsburgh, in the county of Allegheny and State of Pennsylvania, have invented new and useful Improvements in Automatic Train-Stops, of which the following as a specification.

This invention relates to an automatic train stop apparatus and has for its primary object to provide an automatic train stop of very few parts which are connected together in a very substantial manner so as to withstand wear and rough usage which an apparatus of this character is subject to in practice.

An object of the invention is to provide an apparatus that may be readily accommodated in the very small amount of available space in the cab of the locomotive.

Besides the above my invention is distinguished in the novel manner of constructing the throttle lever so that the same may act in the usual manner under normal conditions but will not move the throttle rod under abnormal conditions.

With these and other objects in view the invention will be better understood from the following detail description taken in connection with the accompanying drawings wherein:

Figure 1 is a diagrammatic view of the invention.

Fig. 2 is an enlarged top plan view of the invention.

Fig. 3 is a side elevation thereof.

Fig. 4 is a sectional view through the bleed valve.

Fig. 5 is a detail view of the switch.

Fig. 6 is a sectional view through the locking device.

Fig. 7, 8 and 9 are views of my improved form of recorder.

Again referring to the drawings the numeral 1 designates the throttle rod to which is connected the throttle lever which in this particular instance consists of a main part or member 2 and an auxiliary part or member 3. Both members are supported for pivotal movement by the pin 4 and the arrangement is such that one part may swing independent of the other part.

As illustrated in Fig. 6 the part 2 is provided with a through opening 5 arranged in alinement, when the parts are arranged parallel to each other, with the recess 6 in the part 2, thus it will be seen that when an object is lodged in the recess and opening the parts will move as a unit. In this particular instance the object is the spring pressed plunger 7 of the solenoid 8.

From this arrangement it will be seen that upon energization of the solenoid the plunger or core 7 will be moved to a position to allow movement of part 3 independent of part 2, part 2 remaining in normal position corresponding to the closed position of the throttle lever. Directly connected to the member 3 by the link 10 is the stem 11 of a supply valve 12 arranged in the branch pipe 13 that communicates with the train line 14. A second valve 15 of the piston type has its stem 16 arranged to be struck by the member 2 when the latter is in its normal position.

By referring to Fig. 4 it will be seen that a spring 17 normally holds the passage 18 of the piston 19 out of registration with the ports 20 and 21. This latter valve will be hereinafter known as the bleed valve.

Arranged in the pipe 13 between the two mentioned valves is any suitable regulating valve 22 for regulating the flow of air through the valve 15.

The arrangement of the different elements is such that when the throttle lever is in a position to close the throttle valve the valve 15 will be opened and the valve 12 closed, with the result that when the member 3 is moved independent of the member 2 that is when the electromagnet 8 is energized the valve 12 will be opened for allowing air from the train line to bleed to the atmosphere and thereby cause an application of the brakes. This cannot take place when the members 2 and 3 move as a unit as one of the two valves will be closed at all times.

It is sometimes found advisable to use a recorder and for this purpose I have shown a recorder in Figs. 7 to 9 inclusive consisting of a casing 23 in which is journaled a shaft 24 carrying a cam 25 that is held in a predetermined position by a spring 26 acting on the shaft 24. This shaft has a gear connection 27 with a dial 28, the numerals of which are visible through an opening 29 in the casing.

This cam 25 is arranged to disengage the armature 30 from the catch 31 after the armature has been moved into engagement with the catch by the magnet 32. Thus it will be seen that each time the shaft 24 is moved to disengage the armature from the catch the recorder will be actuated. The armature 30 and catch 31 form the terminals for a break in the circuit 33 of the solenoid 8. This circuit includes a source of current 34 and a spring pressed foot actuated circuit breaker 35.

The magnet 32 is arranged in a partial circuit 34 terminating in a contact shoe 35 at one end and the other end grounded on the locomotive as indicated at 36.

This shoe is arranged to engage the contact rail 36 running parallel to the main track 37. The contact rail 36 is electrically connected to the rail 37 by the switch 38 and connections 39. The movable member of the switch 38 is connected to the semaphore 40 in such a manner that the switch 38 is closed when the semaphore is in danger position.

From the foregoing description it will be seen that when the semaphore is in danger position the magnet 32 will be energized and upon a train passing the semaphore the magnetic attraction of the magnet 32 will throw the armature 30 into engagement with the catch 31 thus closing the circuit of the solenoid 8 which in turn draws its core out of the recess and opening and allows the member 2 to move to normal position where it engages and operates the bleed valve 15 for bleeding air from the train line.

It is of course understood that any suitable means may be used to pull the member 2 to closed position or normal position but proportion of the throttle valve within the steam boiler of the engine could be such that the difference in areas thereof will cause the valve to close.

What I claim is:—

1. An automatic train stop apparatus comprising a duplex throttle lever and bleed valves communicating with the train line and adapted to be alternately opened and closed under predetermined conditions when the lever is operated.

2. An automatic train stop apparatus comprising a two part throttle lever, train controlled means connecting the parts together and an air valve operatively associated with each part for the purpose set forth.

3. An automatic train stop apparatus comprising in combination, a branch pipe arranged to establish communication between the train line and the atmosphere, a pair of valves arranged in said branch pipe, a two part throttle lever arranged to open and close said valves when the parts are fixed relative to each other, and electric means for connecting the parts together.

4. In an automatic train stop apparatus, a pair of valves, a throttle lever consisting of two parts swingingly connected together and adapted to alternately open and close said valves when the parts are fixed against movement relative to each other and train controlled means for locking the parts together.

5. In an automatic train stop apparatus, a throttle lever, consisting of a main part directly connected to the throttle rod and an auxiliary part swingingly associated with the first part, train controlled means for locking the parts together, a valve having its stem connected to the auxiliary part, a second valve arranged to be operated when the main part reaches a predetermined position and a regulating valve arranged between and connected to the first mentioned valves.

6. In an automatic train stop apparatus, a throttle lever consisting of a main part or member connected directly to the throttle rod, an auxiliary part or member swingingly connected to the first part and an electric device for locking the parts together when in a predetermined position.

7. In an automatic train stop apparatus comprising a branch pipe connected to the train line, a feed valve arranged therein, a bleed valve arranged in said pipe, a regulating valve arranged in said pipe between the feed and bleed valves and a throttle lever constructed to alternately open and close said feed and bleed valves under normal conditions and to open both valves under abnormal conditions.

8. In an automatic train stop apparatus comprising a branch pipe connected to the train line, a feed valve arranged therein, a bleed valve arranged in said pipe, a regulating valve arranged in said pipe between the feed and bleed valves and a throttle lever constructed to alternately open and close said feed and bleed valves under normal conditions and to open both valves under abnormal conditions, said throttle lever consisting of two parts having a detachable engagement with each other.

In testimony whereof I affix my signature.

ROBERT WALLER.